US008736196B2

(12) United States Patent
Lee et al.

(10) Patent No.: US 8,736,196 B2
(45) Date of Patent: May 27, 2014

(54) BACKLIGHT UNIT, METHOD OF OPERATING THE SAME AND LIQUID CRYSTAL DISPLAY DEVICE HAVING THE SAME

(75) Inventors: Yun-Gun Lee, Cheonan-si (KR); Ki-Bok Jang, Masan-si (KR); Moon-Shik Kang, Yongin-si (KR); Sung-Kyu Park, Masan-si (KR); Hyun-Ho Seo, Masan-si (KR)

(73) Assignees: Samsung Display Co., Ltd. (KR); Korea Taiyo Yuden Co., Ltd. (KR)

(*) Notice: Subject to any disclaimer, the term of this patent is extended or adjusted under 35 U.S.C. 154(b) by 768 days.

(21) Appl. No.: 12/503,303

(22) Filed: Jul. 15, 2009

(65) Prior Publication Data

US 2010/0091220 A1 Apr. 15, 2010

(30) Foreign Application Priority Data

Oct. 9, 2008 (KR) .................. 10-2008-0098976

(51) Int. Cl.
*H05B 37/02* (2006.01)

(52) U.S. Cl.
USPC ........... 315/308; 315/246; 315/224; 315/291; 315/209 R

(58) Field of Classification Search
USPC ......... 315/127, 175, 128, 119, 224, 225, 291, 315/314, 57, 307–308, 293, 294, 295, 297, 315/194, 209 R, 247, 246, DIG. 2, DIG. 5, 315/DIG. 7; 363/16–20, 24–26, 97, 98, 95, 363/131, 132
See application file for complete search history.

(56) References Cited

U.S. PATENT DOCUMENTS

| | | | | |
|---|---|---|---|---|
| 5,864,212 A * | 1/1999 | Sullivan | .................. | 315/205 |
| 7,067,988 B2 * | 6/2006 | Suzuki | .................. | 315/224 |
| 2002/0140376 A1 * | 10/2002 | Kamata et al. | ............... | 315/276 |
| 2003/0111969 A1 * | 6/2003 | Konishi et al. | ............... | 315/291 |
| 2005/0035729 A1 * | 2/2005 | Lev et al. | .................. | 315/291 |
| 2005/0174818 A1 * | 8/2005 | Lin et al. | .................. | 363/98 |
| 2007/0029945 A1 * | 2/2007 | Yu et al. | .................. | 315/224 |
| 2007/0040517 A1 * | 2/2007 | Yu | .................. | 315/291 |
| 2007/0145915 A1 * | 6/2007 | Roberge et al. | ............... | 315/312 |
| 2008/0151450 A1 * | 6/2008 | Hsu et al. | .................. | 361/86 |
| 2010/0039048 A1 * | 2/2010 | Liu et al. | .................. | 315/307 |

FOREIGN PATENT DOCUMENTS

| | | |
|---|---|---|
| KR | 10-0633480 B1 | 10/2006 |
| KR | 100697204 B1 | 3/2007 |
| KR | 1020070117041 A | 12/2007 |

* cited by examiner

*Primary Examiner* — Alexander H Taningco
*Assistant Examiner* — Christopher Lo
(74) *Attorney, Agent, or Firm* — Cantor Colburn LLP

(57) ABSTRACT

A backlight unit includes; a light source, an inverter which provides the light source with an input voltage, and a printed circuit board ("PCB") connected to the light source, wherein the PCB includes a protection circuit which detects an open-lamp-protection voltage which varies according to a change of the input voltage and changes a reference voltage according to the change of the input voltage, wherein the protection circuit turns off the inverter when the detected open-lamp-protection voltage is higher than the changed reference voltage.

20 Claims, 12 Drawing Sheets

| DUTY | OLP | | | MARGIN | |
|---|---|---|---|---|---|
| | RV | NORMAL | ABNORMAL | NORMAL | ABNORMAL |
| 100% | 6.36 | 0.5 | 16.46 | 5.86 | 10.10 |
| 80% | 5.93 | 0.5 | 14.93 | 5.43 | 9.00 |
| 70% | 5.72 | 0.5 | 14.02 | 5.22 | 8.30 |
| 60% | 5.42 | 0.5 | 13.22 | 4.92 | 7.80 |
| 50% | 5.09 | 0.5 | 12.17 | 4.59 | 7.08 |
| 40% | 4.61 | 0.5 | 10.57 | 4.11 | 5.96 |
| 30% | 4.04 | 0.5 | 8.72 | 3.54 | 4.68 |
| 20% | 3.26 | 0.5 | 6.34 | 2.76 | 3.08 |

BACKLIGHT UNIT, METHOD OF OPERATING THE SAME AND LIQUID CRYSTAL DISPLAY DEVICE HAVING THE SAME

This application claims priority to Korean Patent Application No. 2008-98976, filed on Oct. 9, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a backlight unit, a method of operating the backlight unit, and a liquid crystal display ("LCD") device having the backlight unit. More particularly, exemplary embodiments of the present invention relate to a backlight unit for preventing an over-voltage from being applied to a lamp, a method of operating the backlight unit, and an LCD device having the backlight unit.

2. Description of the Related Art

A backlight unit includes a light source. The backlight unit typically transforms light generated from the light source into a planar light having uniform brightness, and provides a liquid crystal display ("LCD") panel with the planar light.

Examples of the light source include a cold cathode fluorescent lamp ("CCFL"), an external electrode fluorescent lamp ("EEFL"), and a light-emitting diode ("LED"), and various other similar devices.

In order to generate the light in the backlight unit, an operating voltage is provided to the lamp. An element for providing the operating voltage is an operation driver (also referred to as an inverter). The operation driver applies a high voltage to the lamp so that the lamp generates light.

That is, the backlight unit includes a lamp generating light and an operation driver that converts a direct current ("DC") voltage of an input voltage to an alternating current ("AC") voltage and boosts the voltage to provide the lamp with the boosted voltage. The operation driver provides a high voltage for turning on the lamp in an initial stage, and controls a current flowing through the lamp to maintain uniform brightness of the lamp.

However, when a portion of the lamps and its associated driving circuitry breaks down and thus a portion of the lamp and/or its associated driving circuitry is open, e.g., current is unable to flow therethrough, it is difficult to detect the open lamp. Therefore, the current flowing through the other lamps is increased to maintain uniform brightness of the lamps in an abnormal state.

BRIEF SUMMARY OF THE INVENTION

Exemplary embodiments of the present invention provide a backlight unit capable of effectively operating in an abnormal state when an over-voltage is applied to lamps.

Exemplary embodiments of the present invention further provide a method of operating the backlight unit.

Exemplary embodiments of the present invention further provide a LCD device having the backlight unit.

In accordance with one exemplary embodiment of the present invention, a backlight unit includes; a light source, an inverter which provides the light source with an input voltage, and a printed circuit board ("PCB") connected to the light source, wherein the PCB includes a protection circuit which detects an open-lamp-protection voltage which varies according to a change of the input voltage and changes a reference voltage according to the change of the input voltage, and wherein the protection circuit turns off the inverter when the detected open-lamp-protection voltage is higher than the changed reference voltage.

In one exemplary embodiment, the input voltage may be a local dimming voltage.

In one exemplary embodiment, the protection circuit may include a voltage detection part which distributes the input voltage applied to the light source by using a capacitor to detect the open-lamp-protection voltage, a reference voltage changing part which distributes the input voltage by using the capacitor to change the reference voltage according to the change of the input voltage, and a protection-control signal generation part which compares the open-lamp-protection voltage with the reference voltage and generates a protection control signal which controls the operation of the inverter.

In some exemplary embodiments, the capacitor may be a pattern capacitor comprising patterns disposed on at least one of an upper surface and a lower surface of the PCB. In one exemplary embodiment, the protection-control signal generation part may include a comparator which compares the open-lamp-protection voltage with the reference voltage. In one exemplary embodiment, a difference between the open-lamp-protection voltage and the reference voltage may be in a range of about 2 Volts to about 11 Volts.

In one exemplary embodiment, the PCB may further include a plurality of balance capacitors which control the input voltage to substantially uniformly maintain a balance of electrical currents applied to the light source.

In one exemplary embodiment, the PCB may further include a plurality of balance inductors which control the input voltage to substantially uniformly maintain a balance of electrical currents applied to the light source.

In one exemplary embodiment, the backlight unit may further include a feedback control part which generates a feedback signal which controls the voltage level of the input voltage according to whether the light source is turned on normally.

In one exemplary e embodiment, the light source may be one of a plurality of light-emitting diodes ("LEDs") and at least one cold cathode fluorescent lamp ("CCFL").

In accordance with another exemplary embodiment, there is provided a method of operating the backlight unit, the method including applying an input voltage to a light source, detecting an open-lamp-protection voltage using a capacitor distribute the input voltage, changing a reference voltage using the capacitor to distribute the input voltage, and turning off the input voltage applied to the light source when the detected open-lamp-protection voltage is higher than the changed reference voltage.

In one exemplary embodiment, in order to turn off the input voltage, the reference voltage may be changed according to a change of the input voltage, and the open-lamp-protection voltage is compared with the changed reference voltage, and when the detected open-lamp-protection voltage is higher than the changed reference voltage, the input voltage to be applied to the light source is turned off, and alternatively, when the detected open-lamp-protection voltage is the same as or lower than the changed reference voltage, the input voltage applied to the light source is maintained.

In some exemplary embodiments, the input voltage maybe turned off when the detected open-lamp-protection voltage is higher than the changed reference voltage for about 2 seconds or longer. In one exemplary embodiment, a difference between the open-lamp-protection voltage and the reference voltage may be in a range of about 2 Volts to about 11 Volts.

In accordance with still another exemplary embodiment, an LCD device includes an LCD panel which displays an image and a backlight unit which provides the LCD panel with light, wherein the backlight unit includes a light source, an inverter which provides the light source with an input voltage, and a PCB connected to the light source, wherein the PCB includes a protection circuit which detects an open-lamp-protection voltage which varies according to a change of the input voltage and changes a reference voltage according to the change of the input voltage, and the protection circuit turns off the inverter when the detected open-lamp-protection voltage is higher than the changed reference voltage.

In one exemplary embodiment, the input voltage may be a local dimming voltage.

In one exemplary embodiment, the protection circuit may include a voltage detection part which distributes the input voltage applied to the light source by using a capacitor, to detect the open-lamp-protection voltage, a reference voltage changing part which distributes the input voltage by using the capacitor, to change the reference voltage according to the change of the input voltage and a protection-control signal generation part which compares the open-lamp-protection voltage with the reference voltage and generates a protection-control signal which controls the operation of the inverter.

In some exemplary embodiments, the capacitor may be a pattern capacitor including patterns disposed on at least one of an upper surface and a lower surface of the PCB.

In one exemplary embodiment, the PCB may further include a plurality of balance capacitors which control the input voltage to substantially uniformly maintain a balance of electrical currents applied to the light source.

In one exemplary embodiment, the PCB may further include a plurality of balance inductors which control the input voltage to substantially uniformly maintain a balance of electrical currents applied to the light source.

In one exemplary embodiment, the backlight unit may further include a feedback control part which generates a feedback signal which controls the voltage level of the input voltage according to whether the light source is turned on normally.

In one exemplary embodiment, the light source may be one of a plurality of LEDs and at least one CCFL.

According to some exemplary embodiments, when an input voltage and an open-lamp-protection voltage are decreased due to circumstances such as a low local dimming voltage, low temperature, etc., a reference voltage varying according to the decreased input voltage is provided, so that an over-voltage may be prevented from being applied to lamps in spite of an abnormal state such as an open lamp.

BRIEF DESCRIPTION OF THE DRAWINGS

The above and other aspects, features and advantages of exemplary embodiments will become more apparent by describing the exemplary embodiments thereof with reference to the accompanying drawings.

DETAILED DESCRIPTION OF THE INVENTION

Figure 1:
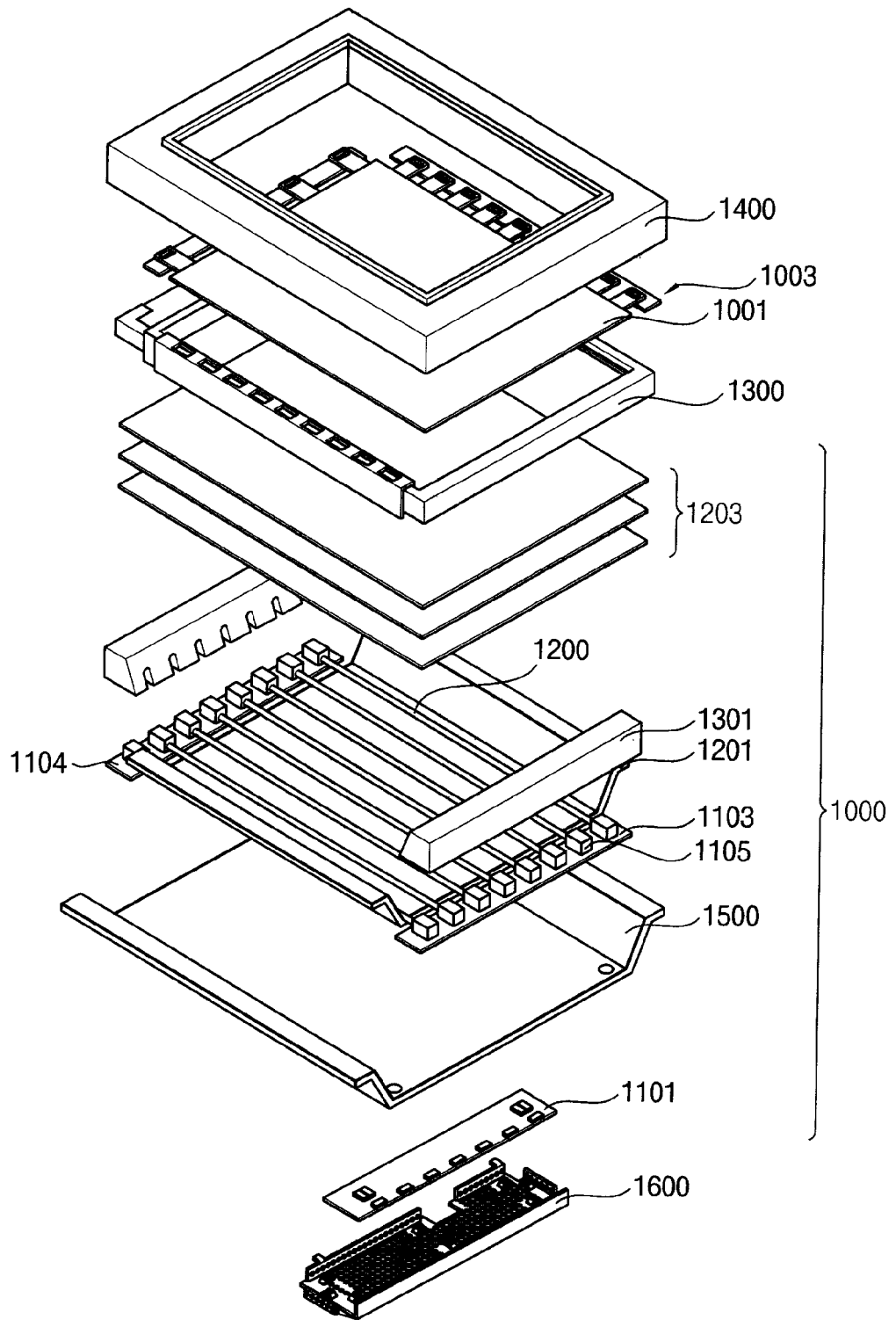
FIG. 1 is an exploded perspective view of a first exemplary embodiment of a liquid crystal display ("LCD") device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

It will be understood that when an element or layer is referred to as being "on," another element, it can be directly on, connected or coupled to the other element or intervening elements may be present. In contrast, when an element is referred to as being "directly on," another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

<Embodiment 1>

Figure 2:
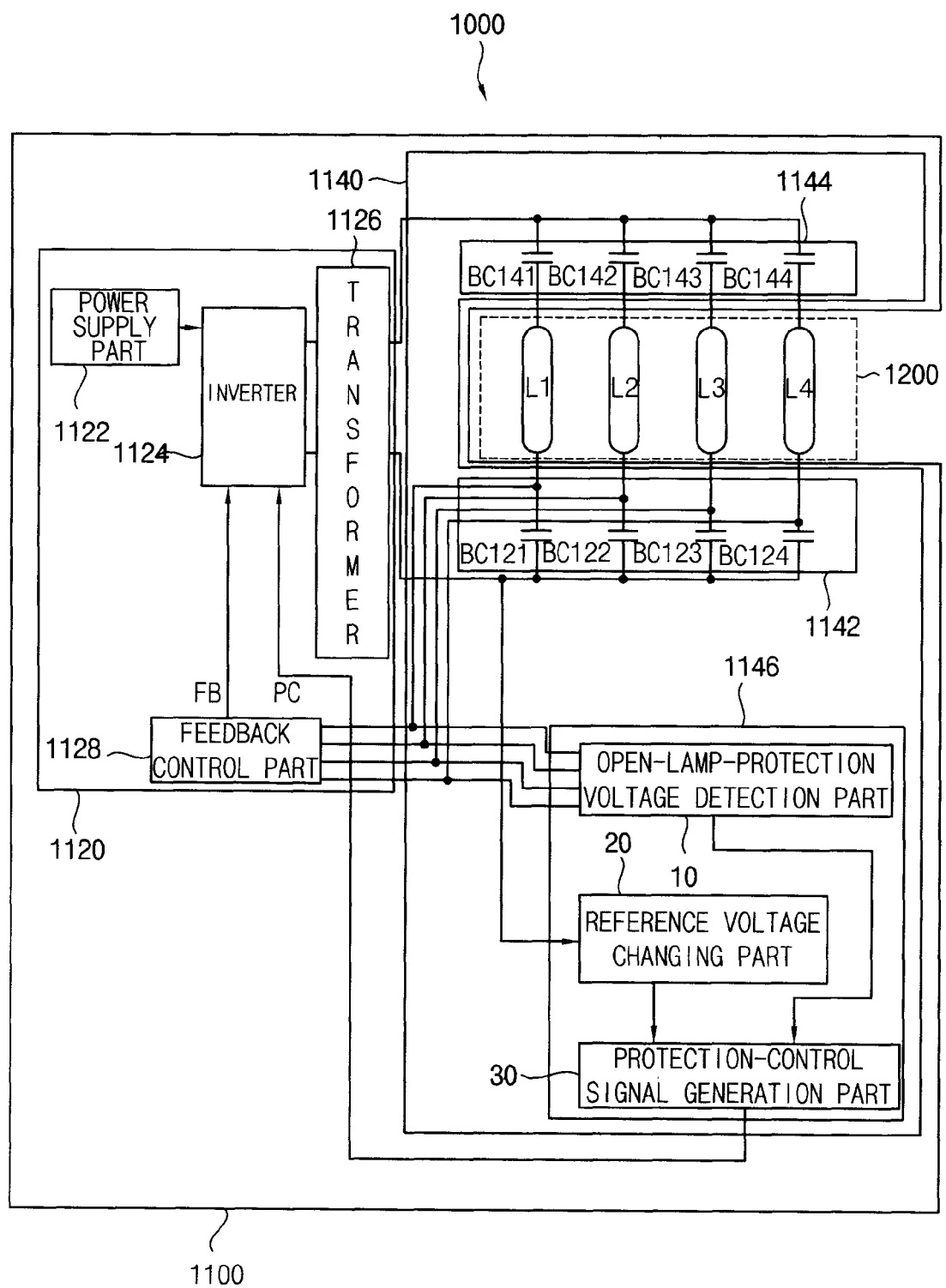
FIG. 2 is a block diagram of an exemplary embodiment of a backlight unit in the exemplary embodiment of the LCD device of FIG. 1.

FIG. 1 is an exploded perspective view of a first exemplary embodiment of a liquid crystal display ("LCD") device according to the present invention. FIG. 2 is a block diagram of an exemplary embodiment of a backlight unit in the LCD device of FIG. 1.

Referring to FIGS. 1 and 2, the first exemplary embodiment of an LCD device includes an LCD panel 1001, a backlight unit 1000, a main support 1300, a top case 1400, a bottom cover 1500 and a cover shield 1600.

The LCD panel 1001 includes an upper substrate (not shown), a lower substrate (not shown) and a liquid crystal layer (not shown) interposed between the upper and lower substrates. The upper and lower substrates face each other and are separated by a predetermined distance from each other. The lower substrate may include a thin-film transistor ("TFT") that is a type of switching element. In one exemplary embodiment, the upper substrate may include a color filter, although alternative exemplary embodiments include configurations wherein the color filter may be formed on the lower substrate. The LCD panel 1001 displays an image by an operation of turning on/off the TFT. In the present exemplary embodiment, the LCD panel 1001 is connected to a printed circuit board ("PCB") 1003 that provides the LCD panel 1001 with a scanning signal and an image signal.

The backlight unit 1000 is disposed in a rear of the LCD panel 1001 to provide light to the LCD panel 1001. The backlight unit 1000 includes a light source part 1200, a reflective sheet 1201, a plurality of optical sheets 1203, a first balance PCB 1103, a second balance PCB 1104 and an inverter PCB 1101.

In the present exemplary embodiment, the light source part 1200 includes a plurality of lamps arranged on the bottom cover 1500 substantially in parallel to one another. The reflective sheet 1201 is disposed between the light source part 1200 and the bottom cover 1500. In FIG. 1, a cold cathode fluorescent lamp ("CCFL") is used as the light source. Alternative exemplary embodiments include configurations wherein a plurality of light-emitting diodes ("LEDs") may be used as the light source.

A side support 1301 may cover both ends of the light source part 1200. The plurality of optical sheets 1203 is disposed over the light source part 1200.

The light source part 1200 is connected to the first balance PCB 1103 and the second balance PCB 1104. The first balance PCB 1103 includes a first capacitor balance circuit 1142 for distributing an electrical current to the light source part 1200 in parallel, and the second balance PCB 1104 includes a second capacitor balance circuit 1144 for distributing an electrical current to the light source part 1200 in parallel. The first and second balance PCBs 1103 and 1104 may be arranged substantially perpendicular to a longitudinal direction of the lamps to connect the lamps electrically in parallel with one another.

In one exemplary embodiment, both ends of the light source part 1200 are inserted into a plurality of lamp sockets 1105, and the lamp sockets 1105 are soldered on the first and second balance PCBs 1103 and 1104, so that the light source part 1200 is electrically connected to the first and second balance PCBs 1103 and 1104. The first and second balance PCBs 1103 and 1104 are connected to the lamp sockets 1105 to provide the light source part 1200 with a high alternating current ("AC") voltage provided from the inverter PCB 1101. Alternative exemplary embodiments include configurations wherein the lamp sockets 1105 are connected to the first and second PCBs 1103 and 1104 in ways other than soldering, e.g., via a conductive adhesive.

The plurality of lamp sockets 1105 soldered on the first and second balance PCBs 1103 and 1104 is mounted on both ends of the bottom cover 1500, and supports the light source part 1200.

Although not shown in FIG. 1, and as described in more detail with respect to FIG. 2, a protection circuit 1146, the first capacitor balance circuit 1142 and the second capacitor balance circuit 1144 may be mounted on the first and second balance PCBs 1103 and 1104.

In the present exemplary embodiment, the first and second capacitor balance circuits 1142 and 1144 include a plurality of balance capacitors. The balance capacitors and the protection circuit 1146 may be formed on the first and second balance PCBs 1103 and 1104. For example, patterns may be formed on an upper surface and a lower surface of the first and second balance PCBs 1103 and 1104, and a pattern capacitor may be defined by the patterns.

The first and second balance PCBs 1103 and 1104 are disposed at an outside of the reflective sheet 1201 and on a side of the bottom cover 1500. In one exemplary embodiment the side support 1301 is combined with the bottom cover 1500 to substantially cover the first and second balance PCBs 1103 and 1104. In another exemplary embodiment the side support 1301 is combined with the bottom cover 1500 to entirely cover the first and second balance PCBs 1103 and 1104.

The top case 1400 covers an edge of the LCD panel 1001 and a side of the main support 1300. The top case 1400 supports and protects the edge of the LCD panel 1001 and the side of the main support 1300.

The bottom cover 1500 covers a lower portion of the main support 1300 to protect elements of the LCD device. The bottom cover 1500 may be combined with the main support 1300 and the top case 1400 by an attachment member (not shown) such as a screw bolt, etc., to form a module.

The inverter PCB 1101 is disposed under the bottom cover 1500. The inverter PCB 1101 provides the light source part 1200 with electrical power.

The cover shield 1600 covers the inverter PCB 1101. Accordingly, the bottom cover 1500 and the cover shield 1600 envelop the inverter PCB 1101 to protect the inverter PCB 1101 from external impacts. The bottom cover 1500 and the cover shield 1600 may include a metal material to shield against electromagnetic waves generated from the inverter PCB 1101.

Although not shown in FIG. 1, an inverter 1124 may be mounted on the inverter PCB 1101. The inverter 1124 maybe disposed toward the cover shield 1600 or a rear surface of the bottom cover 1500. The inverter PCB 1101 may be combined with the cover shield 1600 by a fixing member.

The inverter PCB 1101 converts electrical power provided from a power supply part 1122 into DC electrical power, to provide the light source part 1200 with the DC electrical power.

As described above, the inverter PCB 1101 includes the inverter 1124. In the first exemplary embodiment, the number of the inverters 1124 may be smaller than the number of the lamps of the light source part 1200. The LCD device in accordance with the first exemplary embodiment separately includes the first and second balance PCBs 1103 and 1104 including the first and second capacitor balance circuits 1142 and 1144, respectively, and this feature is different from a conventional LCD device. The first and second capacitor balance circuits 1142 and 1144 divide the electrical power provided from the inverter 1124 in parallel, and provide the light source part 1200 with the electrical power in parallel. Accordingly, an additional plurality of wires for connecting the light source part 1200 to the inverter 1126 may not be necessary, and the light source part 1200 is connected to the first and second balance PCBs 1103 and 1104. That is, one inverter 1124, or a smaller number of inverters 1124 than the number of the lamps of the light source part 1200, may be connected to the first and second balance PCBs 1103 and 1104 through a connector (not shown).

Therefore, the lamps of the light source part 1200 do not directly receive the driving electrical power through corresponding wires (not shown), but receive electrical currents substantially equally distributed in parallel by the first and second capacitor balance circuits 1142 and 1144.

Further, the first and second balance PCBs 1103 and 1104 are mounted in a vacant space, e.g., a recess, within the side support 1301. The side support 1301 and the first and second balance PCBs 1103 and 1104 are mounted in the bottom cover 1500, so that a limited space of the LCD device may be effectively utilized to form a thin LCD device.

Referring now to FIG. 2, the LCD device in accordance with the first exemplary embodiment includes a power supply device 1100 and the light source part 1200.

For example, the light source part 1200 may include first, second, third and fourth lamps L1, L2, L3 and L4.

The power supply device 1100 includes a power part 1120 and a protection part 1140.

The power part 1120 includes the power supply part 1122, the inverter 1124, a transformer 1126 and a feedback control part 1128. The power part 1120 may be mounted on the inverter PCB 1101.

The power supply part 1122 provides the inverter 1124 with driving electrical power. For example, the power supply part 1122 may include a switched mode power supply ("SMPS") that converts electrical power provided from the power supply part 1122 into electrical power suitable for the inverter 1124.

The inverter 1124 changes the DC driving electrical power into an AC input voltage Vin.

The transformer 1126 boosts up the voltage level of the AC input voltage Vin, and provides the light source part 1200 with the boosted input voltage Vin.

The feedback control part 1128 detects whether the light source part 1200 is turned on normally or not. When the light source part 1200 is turned on normally, the feedback control part 1128 provides the inverter 1124 with a feedback signal FB. Alternatively, when the light source part 1200 is not turned on normally, the feedback control part 1128 does not provide the feedback signal FB to the inverter 1124, and the inverter 1124 increases the voltage level of the input voltage Vin that is applied to the light source part 1200 to turn on the light source part 1200.

The protection part 1140 includes a first capacitor balance circuit 1142, a second capacitor balance circuit 1144 and a protection circuit 1146.

The first capacitor balance circuit 1142 includes first, second, third and fourth balance capacitors BC121, BC122, BC123 and BC124. In one exemplary embodiment, the number of the balance capacitors may correspond to the number of the lamps of the light source part 1200.

The first, second, third and fourth balance capacitors BC121, BC122, BC123 and BC124 may be mounted on the first balance PCB 1103.

The first, second, third and fourth balance capacitors BC121, BC122, BC123 and BC124 may be connected to first electrodes of the first, second, third and fourth lamps L1, L2, L3 and L4, respectively. The first, second, third and fourth balance capacitors BC121, BC122, BC123 and BC124 are disposed between the power part 1120 and the first, second, third and fourth lamps L1, L2, L3 and L4 to control the load properties of the first, second, third and fourth lamps L1, L2, L3 and L4 such that the load properties are not changed by circumstances such as temperature, and to maintain a current balance so that uniform currents may flow through the first, second, third and fourth lamps L1, L2, L3 and L4. The protection circuit 1146 is disposed between the first capacitor balance circuit 1142 and the first, second, third and fourth lamps L1, L2, L3 and L4.

The second capacitor balance circuit 1144 includes fifth. sixth, seventh and eighth balance capacitors BC141, BC142, BC143 and BC144. In one exemplary embodiment, the number of the balance capacitors may correspond to the number of the lamps of the light source part 1200.

The fifth, sixth, seventh and eighth balance capacitors BC141, BC142, BC143 and BC144 may be mounted on the second balance PCB 1104.

The fifth, sixth, seventh and eighth balance capacitors BC141, BC142, BC143 and BC144 may be connected to the second electrodes of the first, second, third and fourth lamps L1, L2, L3 and L4, respectively. The fifth, sixth, seventh and eighth balance capacitors BC141, BC142, BC143 and BC144 are disposed between the power part 1120 and the first, second, third and fourth lamps L1, L2, L3 and L4 to control the load properties of the first, second, third and fourth lamps L1, L2, L3 and L4 such that the load properties are not changed by circumstances such as temperature, and to maintain a current balance so that uniform currents may flow through the first, second, third and fourth lamps L1, L2, L3 and L4. In FIG. 2, the protection circuit 1146 is disposed between the first capacitor balance circuit 1142 and the first, second, third and fourth lamps L1, L2, L3 and L4, but the protection circuit 1146 may be disposed between the second capacitor balance circuit 1144 and the first, second, third and fourth lamps L1, L2, L3 and L4.

The protection circuit 1146 includes an open-lamp-protection voltage detection part 10, a reference voltage changing part 20 and a protection-control signal generation part 30.

The open-lamp-protection voltage detection part 10 detects an open-lamp-protection ("OLP") voltage based on the output of the first, second, third and fourth lamps L1, L2, L3 and L4. The OLP voltage is an electrical potential that is increased when the input voltage Vin is increased further than necessary. The OLP voltage may function as an indicator for detecting a fault of the lamps.

The reference voltage changing part 20 changes a reference voltage RV based on the input voltage Vin, and outputs the changed reference voltage RV. When the input voltage Vin increases, the reference voltage RV increases. When the input voltage Vin decreases, the reference voltage RV decreases.

The protection-control signal generation part 30 compares the OLP voltage output from the open-lamp-protection voltage detection part 10 with the reference voltage RV output from the reference voltage changing part 20, and outputs a protection control signal PC. When the OLP voltage is higher than the reference voltage RV, the protection control signal PC is a high state. When the OLP voltage is lower than the reference voltage RV, the protection control signal PC is in a low state.

The high state of the protection control signal PC represents that the first, second, third and fourth lamps L1, L2, L3 and L4 are operated normally, and thus the inverter 1124 provides the light source part 1200 with the input voltage Vin.

The low state of the protection control signal PC represents that the first, second, third and fourth lamps L1, L2, L3 and L4 are operated abnormally. That is, the low state of the protection control signal PC represents that a portion of the first, second, third and fourth lamps L1, L2, L3 and L4 is faulty, and thus the inverter 1124 does not further provide the input voltage Vin to the light source part 1200.

Accordingly, when a portion of the first, second, third and fourth lamps L1, L2, L3 and L4 is faulty, the protection circuit 1146 may prevent the input voltage Vin from increasing continuously.

Figure 3:
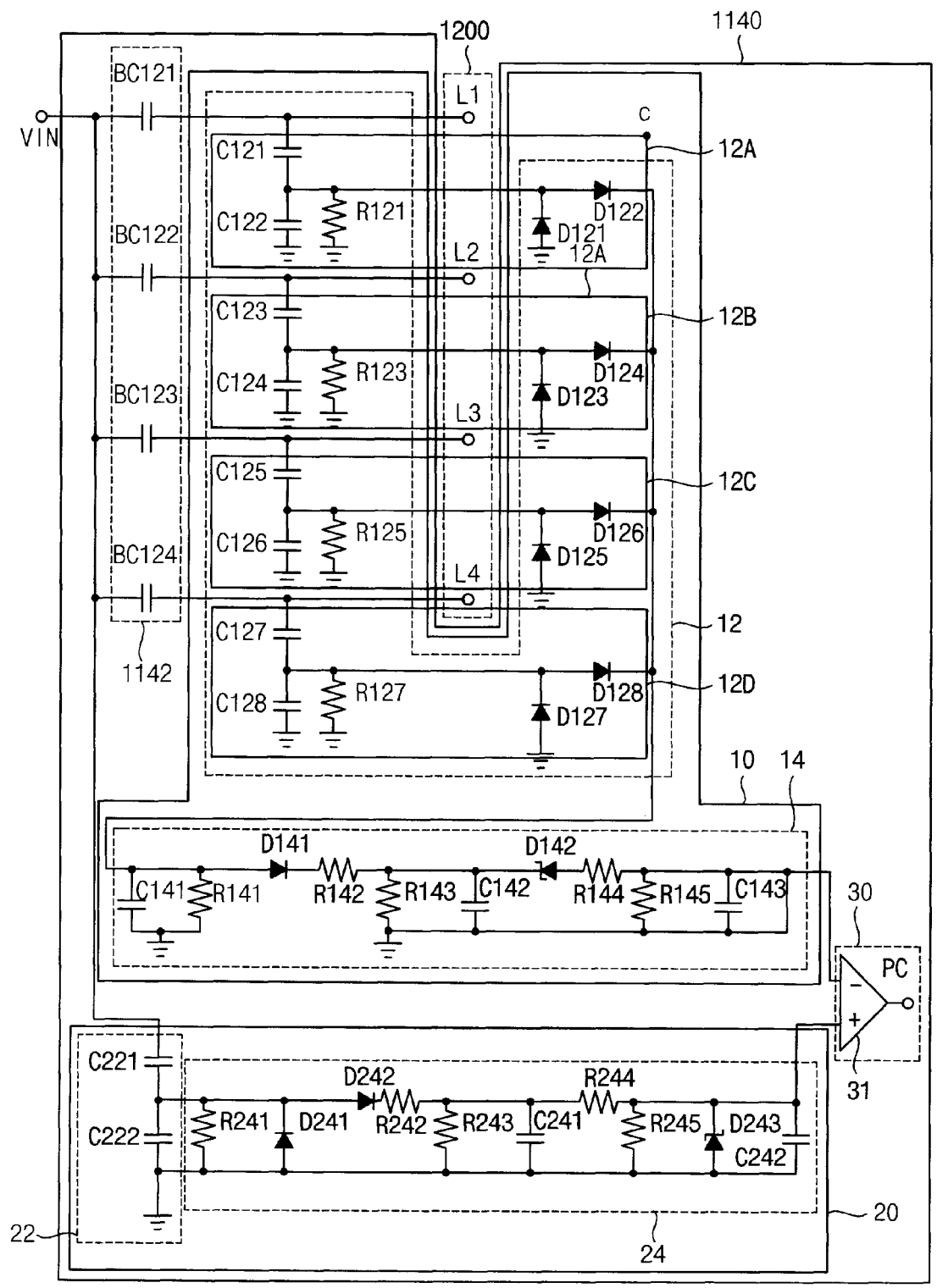
FIG. 3 is a circuit diagram illustrating an exemplary embodiment of a lamp and a protection part in the exemplary embodiment of the backlight unit of FIG. 2.
Figure 4A:
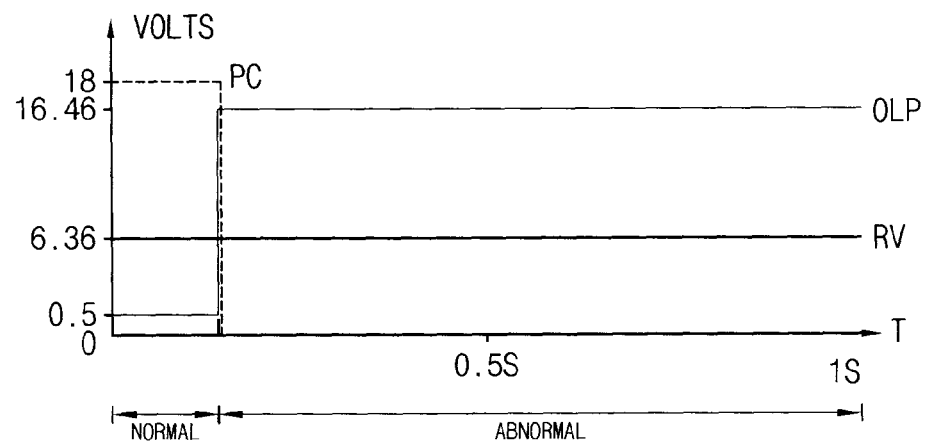
FIGS. 4A-4H are waveform diagrams illustrating a relationship between an open-lamp-protection voltage and a reference voltage when a lamp in the exemplary embodiment of the backlight unit of FIG. 2 operates normally and when the lamp operates abnormally.
Figure 4B:
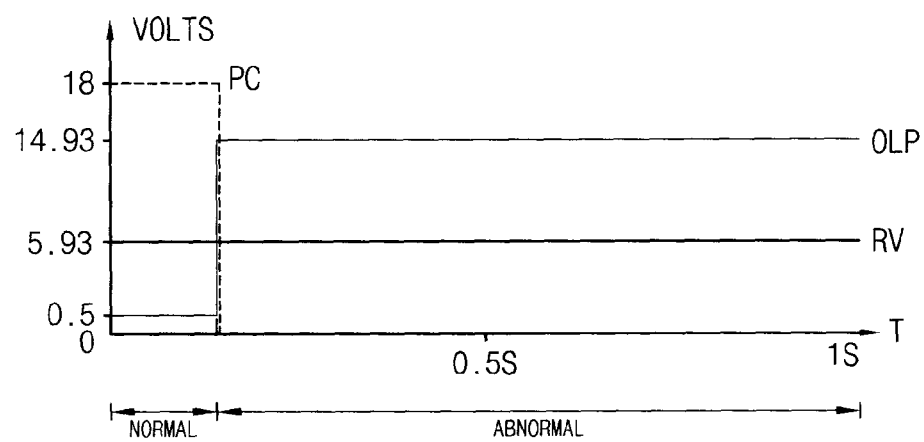
Figure 4C:
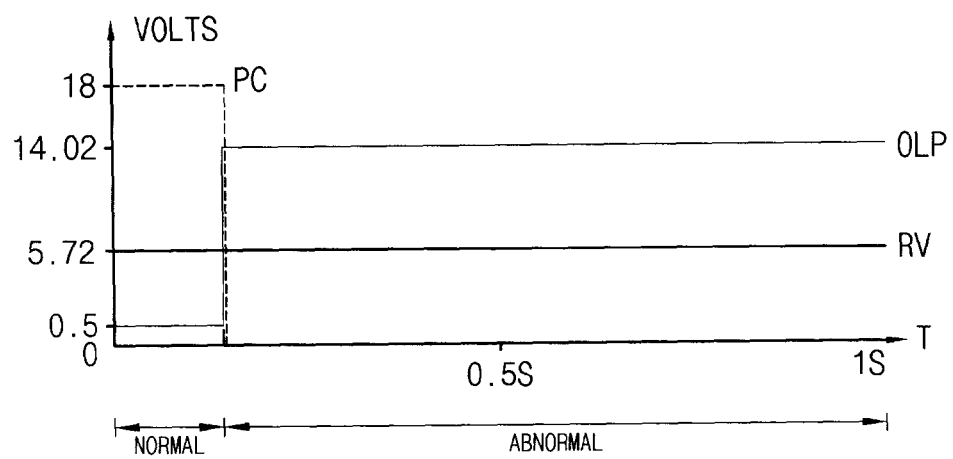
Figure 4D:
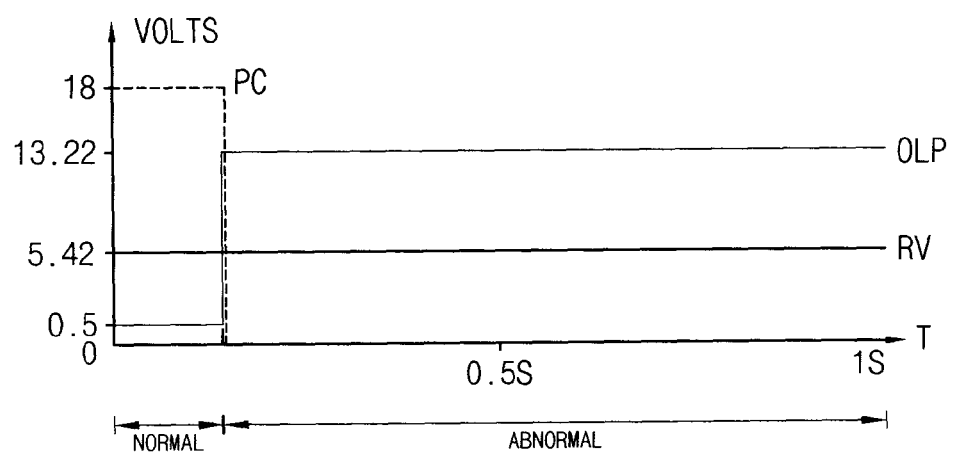
Figure 4E:
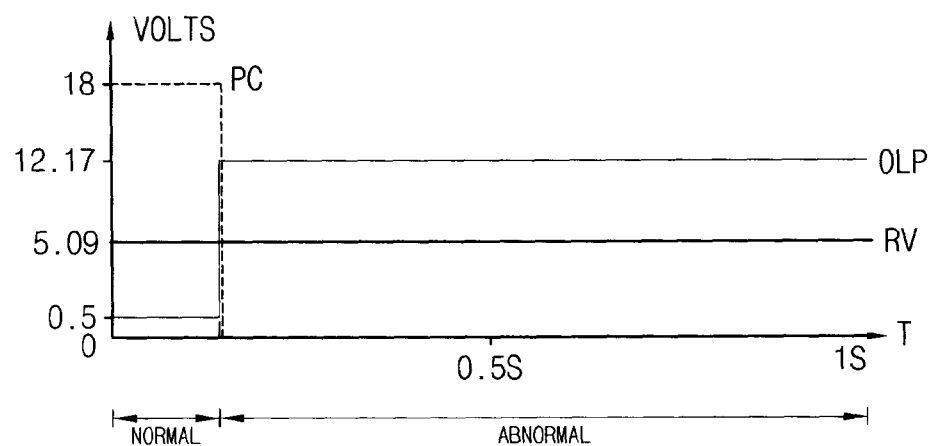
Figure 4F:
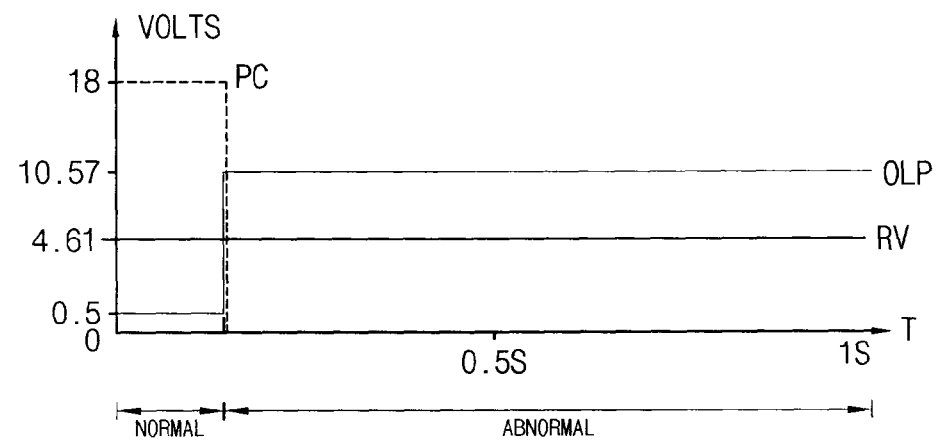
Figure 4G:
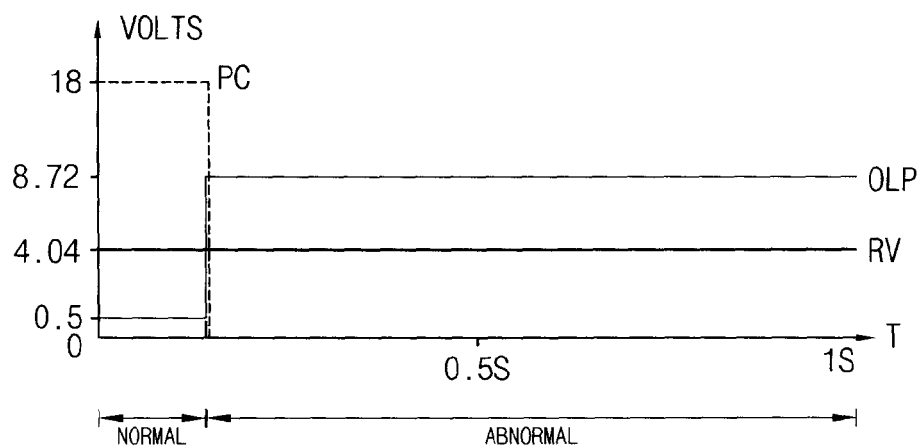
Figure 4H:
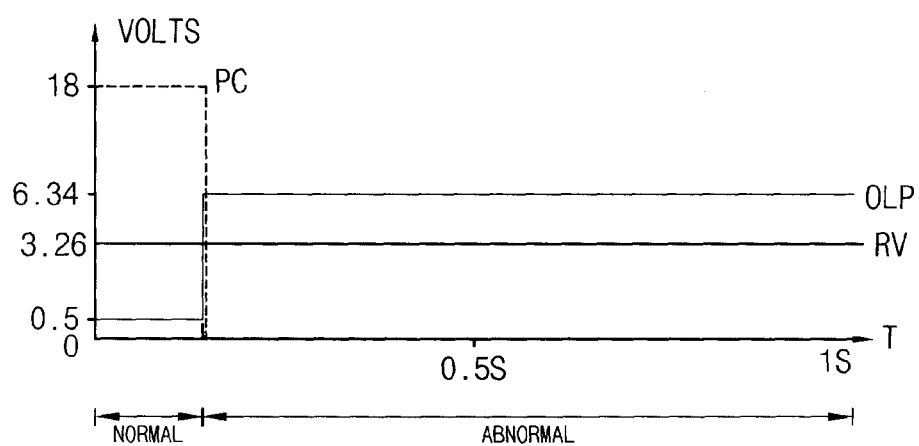

FIG. 3 is a circuit diagram describing the lamp and the protection part of the backlight unit illustrated in FIG. 2.

Referring to FIGS. 2 and 3, the protection part 1140 includes a first capacitor balance circuit 1142 and a protection circuit 1146.

The first capacitor balance circuit 1142 includes the first, second, third and fourth balance capacitors BC121, BC122, BC123 and BC124. First terminals of the first, second, third and fourth balance capacitors BC121, BC122, BC123 and BC124 receive the input voltage Vin, and second terminals of the first, second, third and fourth balance capacitors BC121, BC122, BC123 and BC124 are connected to the first electrodes of the first, second, third and fourth lamps L1, L2, L3 and L4. The first, second, third and fourth balance capacitors BC121, BC122, BC123 and BC124 control the load properties of the first, second, third and fourth lamps L1, L2, L3 and L4 such that the load properties are not changed by circumstances such as temperature, and maintain a current balance so that uniform currents may flow through the first, second, third and fourth lamps L1, L2, L3 and L4.

The protection circuit 1146 includes an open-lamp-protection voltage detection part 10, a reference voltage changing part 20 and a protection-control signal generation part 30.

The open-lamp-protection voltage detection part 10 includes a current detection part 12 and a first smoothing circuit part 14.

The current detection part 12 includes a first current detection part 12A, a second current detection part 12B, a third current detection part 12C and a fourth current detection part 12D.

The first current detection part 12A includes a first capacitor C121, a second capacitor C122, a first resistor R121, a first diode D121 and a second diode D122. The first capacitor C121 and the second capacitor C122 are connected to each other in series, and are electrically connected in parallel to a second terminal of the first balance capacitor BC121. A first terminal of the first resistor R121 and an anode of the first diode D121 are electrically connected in parallel to a first terminal of the second capacitor C122. The input voltage Vin is distributed by the first capacitor C121, the second capacitor C122 and the first resistor R121. The first capacitor C121 maybe a pattern capacitor that is defined by a pattern formed on an upper surface and a lower surface of the first balance PCB 1103. A second terminal of the second capacitor C122, a second terminal of the first resistor R121 and a cathode of the first diode D121 are electrically shorted. The anode of the first diode D121 is connected to a cathode of the second diode D122, and an anode of the second diode D122 is connected to a common node C. Accordingly, the distributed input voltage Vin is rectified by the first diode D121 and the second diode D122.

The second current detection part 12B includes a third capacitor C123, a fourth capacitor C124, a second resistor R123, a third diode D123 and a fourth diode D124. The third capacitor C123 and the fourth capacitor C124 are connected to each other in series, and are electrically connected in parallel to a second terminal of the second balance capacitor BC122. A first terminal of the second resistor R123 and an anode of the third diode D123 are electrically connected in parallel to a first terminal of the fourth capacitor C124. The input voltage Vin is distributed by the third capacitor C123, the fourth capacitor C124 and the second resistor R123. The third capacitor C123 may be a pattern capacitor that is defined by a pattern formed on an upper surface and a lower surface of the first balance PCB 1103.

A second terminal of the fourth capacitor C124, a second terminal of the second resistor R123 and a cathode of the third diode D123 are electrically shorted. The anode of the third diode D123 is connected to a cathode of the fourth diode D124, and an anode of the fourth diode D124 is connected to the common node C. Accordingly, the distributed input voltage Vin is rectified by the third diode D123 and the fourth diode D124.

The third current detection part 12C includes a fifth capacitor C125, a sixth capacitor C126, a third resistor R125, a fifth diode D125 and a sixth diode D126. The fifth capacitor C125 and the sixth capacitor C126 are connected to each other in series, and are electrically connected in parallel to a second terminal of the third balance capacitor BC123. A first terminal of the third resistor R125 and an anode of the fifth diode D125 are electrically connected in parallel to a first terminal of the sixth capacitor C126. The input voltage Vin is distributed by the fifth capacitor C125, the sixth capacitor C126 and the third resistor R125. The fifth capacitor C125 may be a pattern capacitor that is defined by a pattern formed on an upper surface and a lower surface of the first balance PCB 1103.

A second terminal of the sixth capacitor C126, a second terminal of the third resistor R125 and a cathode of the fifth diode D125 are electrically shorted. The anode of the fifth diode D125 is connected to a cathode of the sixth diode D126, and an anode of the sixth diode D126 is connected to the common node C. Accordingly, the distributed input voltage Vin is rectified by the fifth diode D125 and the sixth diode D126.

The fourth current detection part 12D includes a seventh capacitor C127, an eighth capacitor C128, a fourth resistor R127, a seventh diode D127 and an eighth diode D128. The seventh capacitor C127 and the eighth capacitor C128 are connected to each other in series, and are electrically connected in parallel to a second terminal of the fourth balance capacitor BC124. A first terminal of the fourth resistor R127 and an anode of the seventh diode D127 are electrically connected in parallel to a first terminal of the eighth capacitor C128. The input voltage Vin is distributed by the seventh capacitor C127, the eighth capacitor C128 and the fourth resistor R127. The seventh capacitor C127 maybe a pattern capacitor that is defined by a pattern formed on an upper surface and a lower surface of the first balance PCB 1103.

A second terminal of the eighth capacitor C128, a second terminal of the fourth resistor R127 and a cathode of the seventh diode D127 are electrically shorted. The anode of the seventh diode D127 is connected to a cathode of the eighth diode D128, and an anode of the eighth diode D128 is connected to the common node C. Accordingly, the distributed input voltage Vin is rectified by the seventh diode D127 and the eighth diode D128.

The first smoothing circuit part 14 includes ninth, tenth and eleventh capacitors C141, C142 and C143, fifth, sixth, seventh, eighth and ninth resistors R141, R142, R143, R144, and R145, a ninth diode D141 and a first Zener diode D142.

A first terminal of the ninth capacitor C141 and a first terminal of the fifth resistor R141 are electrically connected in parallel to the common node C. A second terminal of the ninth capacitor C141 and a second terminal of the fifth resistor R141 are electrically shorted.

The ninth diode D141 and the sixth resistor R142 are connected to the common node C in series. A cathode of the ninth diode D141 is connected to the common node C, and an anode of the ninth diode D141 is connected to a first terminal of the sixth resistor R142.

A first terminal of the tenth capacitor C142 and a first terminal of the seventh resistor R143 are electrically connected in parallel to a second terminal of the sixth resistor R142. A second terminal of the tenth capacitor C142 and a second terminal of the seventh resistor R143 are electrically shorted.

The first Zener diode D142 and the eighth resistor R144 are connected to the second terminal of the sixth resistor R142 in series. An anode of the first Zener diode D142 is connected to the second terminal of the sixth resistor R142, and a cathode of the first Zener diode D142 is connected to a first terminal of the eighth resistor R144.

A first terminal of the eleventh capacitor C143 and a first terminal of the ninth resistor R145 are electrically connected in parallel to a second terminal of the eighth resistor R144. A second terminal of the eleventh capacitor C143 and a second terminal of the ninth resistor R145 are electrically shorted.

The rectified input voltage Vin is smoothed by the ninth, tenth and eleventh capacitors C141, C142 and C143, the fifth, sixth, seventh, eighth and ninth resistors R141, R142, R143, R144, and R145, the ninth diode D141 and the first Zener diode D142 that the first smoothing circuit part 14 includes. Accordingly, the OLP voltage that is a DC voltage is output from the first terminals of the eleventh capacitor C143 and the ninth resistor R145.

The reference voltage changing part 20 includes a voltage distribution part 22 and a second smoothing circuit part 24.

The voltage distribution part 22 includes a twelfth capacitor C221 and a thirteenth capacitor C222. The twelfth capacitor C221 and the thirteenth capacitor C222 are connected to the input voltage Vin in series. The second smoothing circuit part 24 is connected to a node between the twelfth capacitor C221 and the thirteenth capacitor C222, and connected to a node between the thirteenth capacitor C222 and ground. The input voltage Vin is distributed by the twelfth capacitor C221 and the thirteenth capacitor C222. The twelfth capacitor C221 may be a pattern capacitor that is defined by a pattern formed on an upper surface and a lower surface of the first balance PCB 1103.

The second smoothing circuit part 24 includes a fourteenth capacitor C241, a fifteenth capacitor C242, tenth, eleventh, twelfth, thirteenth and fourteenth resistors R241, R242, R243, R244 and R245, a tenth diode D241, an eleventh diode D242 and a second Zener diode D243.

The tenth resistor R241 and the tenth diode D241 are electrically connected in parallel to the thirteenth capacitor C222 of the voltage distribution part 22. The input voltage Vin is applied to a first terminal of the twelfth capacitor C221, and a second terminal of the twelfth capacitor C221 is connected to a first terminal of the thirteenth capacitor C222, a first terminal of the tenth resistor R241 and an anode of the tenth diode D241. A second terminal of the thirteenth capacitor C222, a second terminal of the tenth resistor R241 and a cathode of the tenth diode D241 are electrically shorted. An anode of the tenth diode D241 is connected to a first terminal of the eleventh resistor R242, and a second terminal of the eleventh resistor R242 is connected to a first terminal of the twelfth resistor R243 and a first terminal of the fourteenth capacitor C241. A second terminal of the twelfth resistor R243 and a second terminal of the fourteenth capacitor C241 are electrically shorted.

A first terminal of the thirteenth resistor R244 is connected to the second terminal of the eleventh resistor R242, and a second terminal of the thirteenth resistor R244 is connected to a first terminal of the fourteenth resistor R245, a first terminal of the second Zener diode D243 and a first terminal of the fifteenth capacitor C242. A second terminal of the fourteenth resistor R245, a second terminal of the second Zener diode D243 and a second terminal of the fifteenth capacitor C242 are electrically shorted.

The input voltage Vin is rectified and smoothed by the fourteenth capacitor C241, the fifteenth capacitor C242, the tenth, eleventh, twelfth, thirteenth and fourteenth resistors R241, R242, R243, R244 and R245, the tenth diode D241, the eleventh diode D242 and the second Zener diode D243 that the second smoothing circuit part 24 includes. Accordingly, the reference voltage RV that is a DC voltage is output from the second terminal of the thirteenth resistor R244.

The protection-control signal generation part 30 includes a comparator 31. A negative terminal of the comparator 31 receives the OLP voltage that is an output of the first smoothing circuit part 14, and a positive terminal of the comparator 31 receives the reference voltage RV that is an output of the second smoothing circuit part 24.

The comparator 31 compares the OLP voltage with the reference voltage RV, and outputs a protection control signal PC. When the OLP voltage is higher than the reference voltage RV, the comparator 31 outputs a protection control signal PC having a high state. When the OLP voltage is lower than the reference voltage RV, the comparator 31 outputs a protection control signal PC having a low state.

The high state of the protection control signal PC represents that the first, second, third and fourth lamps L1, L2, L3 and L4 are operated normally, and thus the inverter 1124 provides the light source part 1200 with the input voltage Vin.

The low state of the protection control signal PC represents that the first, second, third and fourth lamps L1, L2, L3 and L4 are operated abnormally. That is, the low state of the protection control signal PC represents that a portion of the first, second, third and fourth lamps L1, L2, L3 and L4 is faulty, and thus the inverter 1124 does not further provide the input voltage Vin to the light source part 1200.

Accordingly, when a portion of the first, second, third and fourth lamps L1, L2, L3 and L4 is faulty, the protection circuit 1146 may prevent the input voltage Vin from increasing continuously.

FIGS. 4A-4H are graphs of exemplary waveforms showing a relationship between an OLP voltage and a reference voltage when the lamp illustrated in FIG. 2 operates normally and when the lamp operates abnormally.

Figures 5, 6:
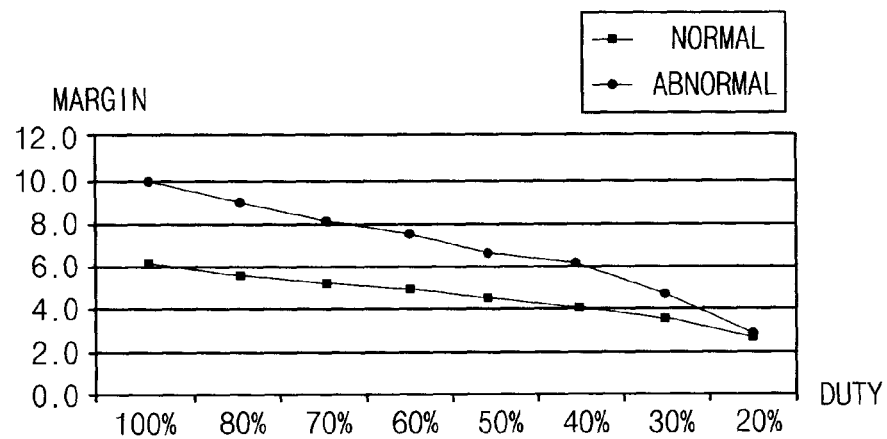
FIG. 5 is a graph illustrating an exemplary voltage level difference between an open-lamp-protection voltage and a reference voltage when the lamp in the exemplary embodiment of a backlight unit of FIG. 2 operates normally and when the lamp operates abnormally, according to a duty ratio of an input voltage.
FIG. 6 is a table illustrating an exemplary relationship between an open-lamp-protection voltage and a reference voltage when the lamp in the exemplary embodiment of a backlight unit of FIG. 2 operates normally and when the lamp operates abnormally, according to a duty ratio of an input voltage.

FIG. 5 is a graph showing a voltage level difference between an OLP voltage and a reference voltage when the lamp illustrated in FIG. 2 operates normally and when the lamp operates abnormally, according to a duty ratio of an input voltage.

FIG. 6 is a table describing a relationship between an open-lamp-protection voltage and a reference voltage when the lamp illustrated in FIG. 2 operates normally and when the lamp operates abnormally, according to a duty ratio of an input voltage.

Hereinafter, the "duty ratio of the input voltage" represents a ratio of an actual input voltage to a maximum input voltage, for example, when the LCD device uses a local dimming method, which divides the light source part into a plurality of luminous blocks based on an image displayed by the LCD panel 1001 and controls brightness separately in each of the luminous blocks.

Referring to FIG. 2, FIG. 4A, FIG. 5 and FIG. 6, when the duty ratio of the input voltage is 100%, the state of the protection control signal PC and a margin vary according to a variation of the voltage level of the OLP voltage. In FIGS. 5 and 6, the "MARGIN" represents a voltage level difference between the reference voltage RV and the OLP voltage.

When the first, second, third and fourth lamps L1, L2, L3 and L4 are operated normally, the voltage level of the OLP voltage was about 0.5 Volts lower than, for example, about 6.35 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 5.86 Volts.

When the first, second, third and fourth lamps L1, L2, L3 and L4 are operated abnormally, the voltage level of the OLP voltage was about 16.46 Volts higher than 6.35 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 16.46 Volts.

Since the voltage level of the OLP voltage was higher than that of the reference voltage RV, the voltage level of the protection control signal PC was 0 Volts, which is a low state. The margin was about 10.10 Volts.

Referring to FIG. 2, FIG. 4B, FIG. 5 and FIG. 6, when the duty ratio of the input voltage is 80%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 5.93 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 5.43 Volts.

When the first, second, third and fourth lamps L1, L2, L3 and L4 are operated abnormally, the voltage level of the OLP voltage was about 14.93 Volts, which is higher than 5.93 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 14.93 Volts.

Since the voltage level of the OLP voltage was higher than that of the reference voltage RV, the voltage level of the protection control signal PC was 0 Volts, which is a low state. The margin was about 9.00 Volts.

Referring to FIG. 2, FIG. 4C, FIG. 5 and FIG. 6, when the duty ratio of the input voltage is 70%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 5.72 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 5.22 Volts.

When the first, second, third and fourth lamps L1, L2, L3 and L4 are operated abnormally, the voltage level of the OLP voltage was about 14.02 Volts, which is higher than 5.72 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 14.02 Volts.

Since the voltage level of the OLP voltage was higher than that of the reference voltage RV, the voltage level of the protection control signal PC was 0 Volts, which is a low state. The margin was about 8.30 Volts.

Referring to FIG. 2, FIG. 4D, FIG. 5 and FIG. 6, when the duty ratio of the input voltage is 60%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 5.42 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 4.92 Volts.

When the first, second, third and fourth lamps L1, L2, L3 and L4 are operated abnormally, the voltage level of the OLP voltage was about 13.22 Volts, which is higher than 5.42 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 13.22 Volts.

Since the voltage level of the OLP voltage was higher than that of the reference voltage RV, the voltage level of the protection control signal PC was 0 Volts, which is a low state. The margin was about 7.80 Volts.

Referring to FIG. 2, FIG. 4E, FIG. 5 and FIG. 6, when the duty ratio of the input voltage is 50%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 5.09 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 4.59 Volts.

When the first, second, third and fourth lamps L1, L2, L3 and L4 are operated abnormally, the voltage level of the OLP voltage was about 12.17 Volts, which is higher than 5.09 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 12.17 Volts.

Since the voltage level of the OLP voltage was higher than that of the reference voltage RV, the voltage level of the protection control signal PC was 0 Volts, which is a low state. The margin was about 7.08 Volts.

Referring to FIG. 2, FIG. 4F, FIG. 5 and FIG. 6, when the duty ratio of the input voltage is 40%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 4.61 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 4.11 Volts.

When the first, second, third and fourth lamps L1, L2, L3 and L4 are operated abnormally, the voltage level of the OLP voltage was about 10.57 Volts, which is higher than 4.61 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 10.57 Volts.

Since the voltage level of the OLP voltage was higher than that of the reference voltage RV, the voltage level of the protection control signal PC was 0 Volts, which is a low state. The margin was about 5.96 Volts.

Referring to FIG. 2, FIG. 4G, FIG. 5 and FIG. 6, when the duty ratio of the input voltage is 30%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 4.04 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 3.54 Volts.

When the first, second, third and fourth lamps L1, L2, L3 and L4 are operated abnormally, the voltage level of the OLP voltage was about 8.72 Volts, which is higher than 4.04 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 8.72 Volts.

Since the voltage level of the OLP voltage was higher than that of the reference voltage RV, the voltage level of the protection control signal PC was 0 Volts, which is a low state. The margin was about 4.68 Volts.

Referring to FIG. 2, FIG. 4H, FIG. 5 and FIG. 6, when the duty ratio of the input voltage is 20%, the state of the protection control signal PC and a margin vary according to a variation of the voltage level of the OLP voltage.

When the first, second, third and fourth lamps L1, L2, L3 and L4 are operated normally, the voltage level of the OLP voltage was about 0.5 Volts, which is lower than, for example, about 3.26 Volts of the reference voltage RV. Since the first, second, third and fourth lamps L1, L2, L3 and L4 are operated normally, a higher input voltage Vin for turning on the first, second, third and fourth lamps L1, L2, L3 and L4 may not be necessary, and thus the OLP voltage is maintained at the low voltage level of about 0.5 Volts.

Since the voltage level of the OLP voltage was lower than that of the reference voltage RV, the voltage level of the protection control signal PC was 18 Volts, which is a high state. The margin was about 2.76 Volts.

When the first, second, third and fourth lamps L1, L2, L3 and L4 are operated abnormally, the voltage level of the OLP voltage was about 6.34 Volts, which is higher than 3.26 Volts of the reference voltage RV. Since the first, second, third and fourth lamps L1, L2, L3 and L4 are operated abnormally, a higher input voltage Vin is necessary to turn on the first, second, third and fourth lamps L1, L2, L3 and L4, and thus the OLP voltage is maintained at the high voltage level of about 6.34 Volts.

Since the voltage level of the OLP voltage was higher than that of the reference voltage RV, the voltage level of the protection control signal PC was 0 Volts, which is a low state. The margin was about 3.08 Volts.

Referring back to FIGS. 4A-4H, FIG. 5 and FIG. 6, when the OLP voltage was lower than the reference voltage RV, that is, the first, second, third and fourth lamps L1, L2, L3 and L4 were operated normally, the protection control signal PC was maintained in the high state. Alternatively, when the OLP voltage was higher than the reference voltage RV, that is, the first, second, third and fourth lamps L1, L2, L3 and L4 were operated abnormally, the protection control signal PC was maintained in the low state.

Further, as the duty ratio of the input voltage decreased, both the reference voltage RV and the OLP voltage were reduced, and the margin corresponding to the duty ratio of the input voltage was also reduced.

In consideration of a deviation of the OLP voltage, the margin may be in a range of about 2 Volts to about 11 Volts. If the first, second, third and fourth lamps L1, L2, L3 and L4 are operated abnormally, the inverter 1126 stops applying the input voltage Vin to the first, second, third and fourth lamps L1, L2, L3 and L4 when the low state of the protection control signal PC is maintained for about two seconds.

Figure 7:
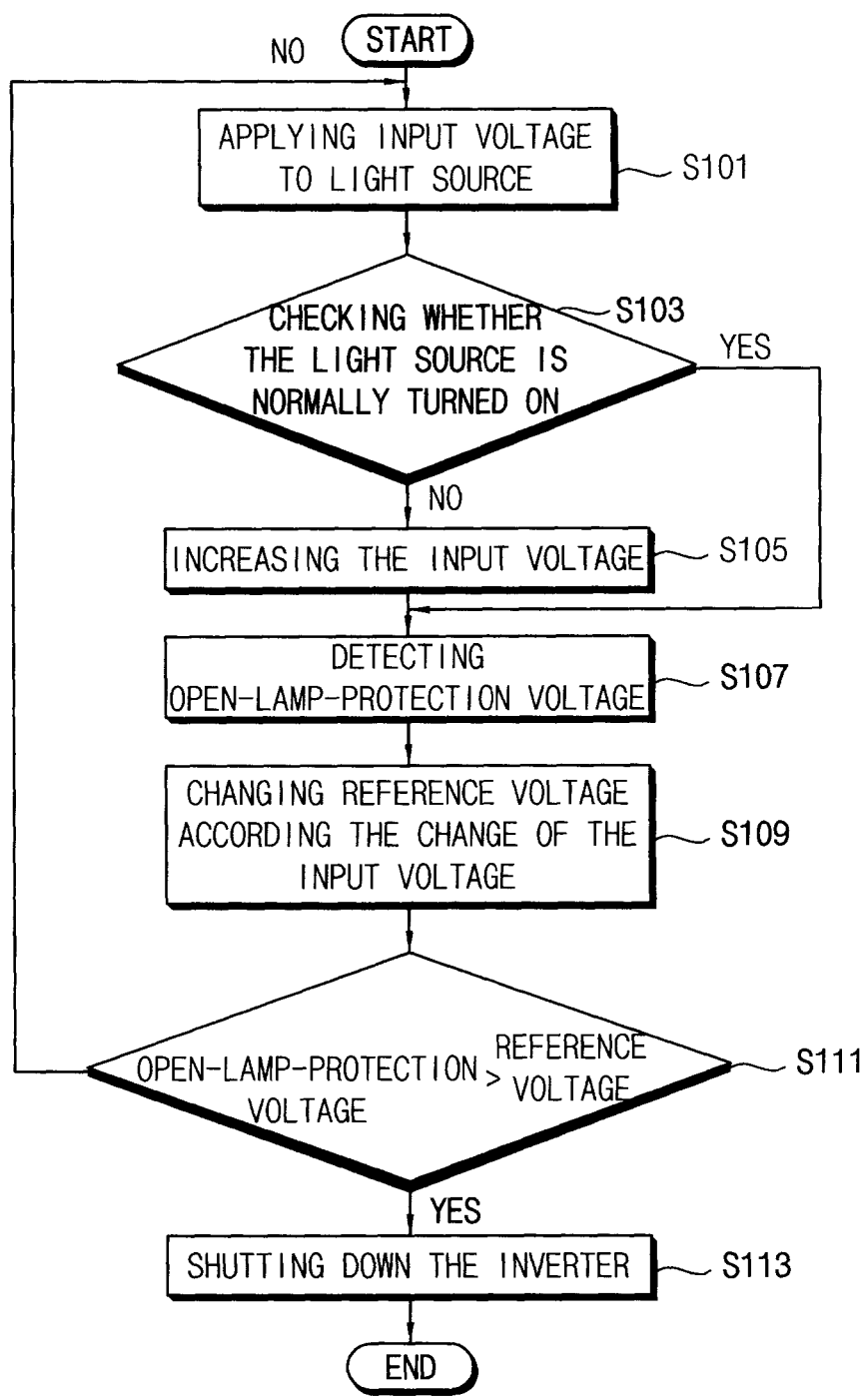
FIG. 7 is a flowchart of an exemplary embodiment of a method of operating the exemplary embodiment of a backlight unit of FIG. 2.

FIG. 7 is a flowchart for describing an exemplary embodiment of a method of operating the backlight unit illustrated in FIG. 2.

Referring to FIG. 2 and FIG. 7, when the operation of the backlight unit 1000 starts, the inverter 1124 applies the input voltage Vin to the light source part 1200 (step S101).

Whether the lamps of the light source part 1200 are turned on normally is checked (step S103).

When a portion of the lamps is not turned on normally and lighting of the lamps is not detected, the input voltage Vin is increased and the increased input voltage Vin is applied to the light source part 1200 (step S105).

The OLP voltage is also increased by the increased input voltage Vin, and the increased OLP voltage is detected (step S107).

When the lamps are turned on normally and lighting of the lamps is detected, the input voltage Vin is maintained and the maintained input voltage Vin is applied to the light source part 1200. Since the input voltage Vin is not increased, a low voltage level of the OLP voltage is detected (step S107).

The reference voltage RV is changed according to the change of the input voltage Vin (step S 109).

The reference voltage RV and the OLP voltage are compared (step S111).

When the voltage level of the OLP voltage is lower than that of the reference voltage RV, the inverter 1124 applies electrical power to the light source part 1200 continuously. That is, the input voltage Vin is substantially continuously applied to the light source part 1200 (step S101).

Alternatively, when the voltage level of the OLP voltage is higher than that of the reference voltage RV, the inverter 1124 is shut down, e.g., turned off, and thus does not apply electrical power to the light source part 1200, so that the operation of the backlight unit 1000 is interrupted (step S113).

In one exemplary embodiment, the input voltage may be applied by a local dimming method, which divides the light source part into a plurality of luminous blocks based on an image displayed by the LCD panel 1001 and controls brightness separately in each of the luminous blocks.

For example, the brightness is controlled separately in each of the luminous blocks according to a gray scale extracted from an image signal. When the image signal has a low gray value, a low local dimming voltage is applied to the luminous blocks, so that the luminous blocks have low brightness.

Alternatively, when the image signal has a high gray value, a high local dimming voltage is applied to the luminous blocks, so that the luminous blocks have high brightness.

When the low local dimming voltage (i.e., the input voltage) is applied to the light source part 1200, the voltage level of the OLP voltage is also decreased. If the decreased voltage level of the OLP voltage is lower than the reference voltage RV though the light source part 1200 operates abnormally, the protection circuit 1146 may not operate.

According to the first exemplary embodiment, in order to prevent the above-mentioned non-operation of the protection circuit 1146, the reference voltage RV is also decreased, when the low local dimming voltage is applied to the light source part 1200 and thus the OLP voltage is decreased. Accordingly, whenever the light source part 1200 operates abnormally, the OLP voltage is higher than the reference voltage RV. Therefore, the protection circuit 1146 may be prevented from operating even though the light source part 1200 operates abnormally. Additionally, though the OLP voltage is decreased due to a low temperature, the protection circuit 1146 may operate normally.

<Embodiment 2>

Figure 8:
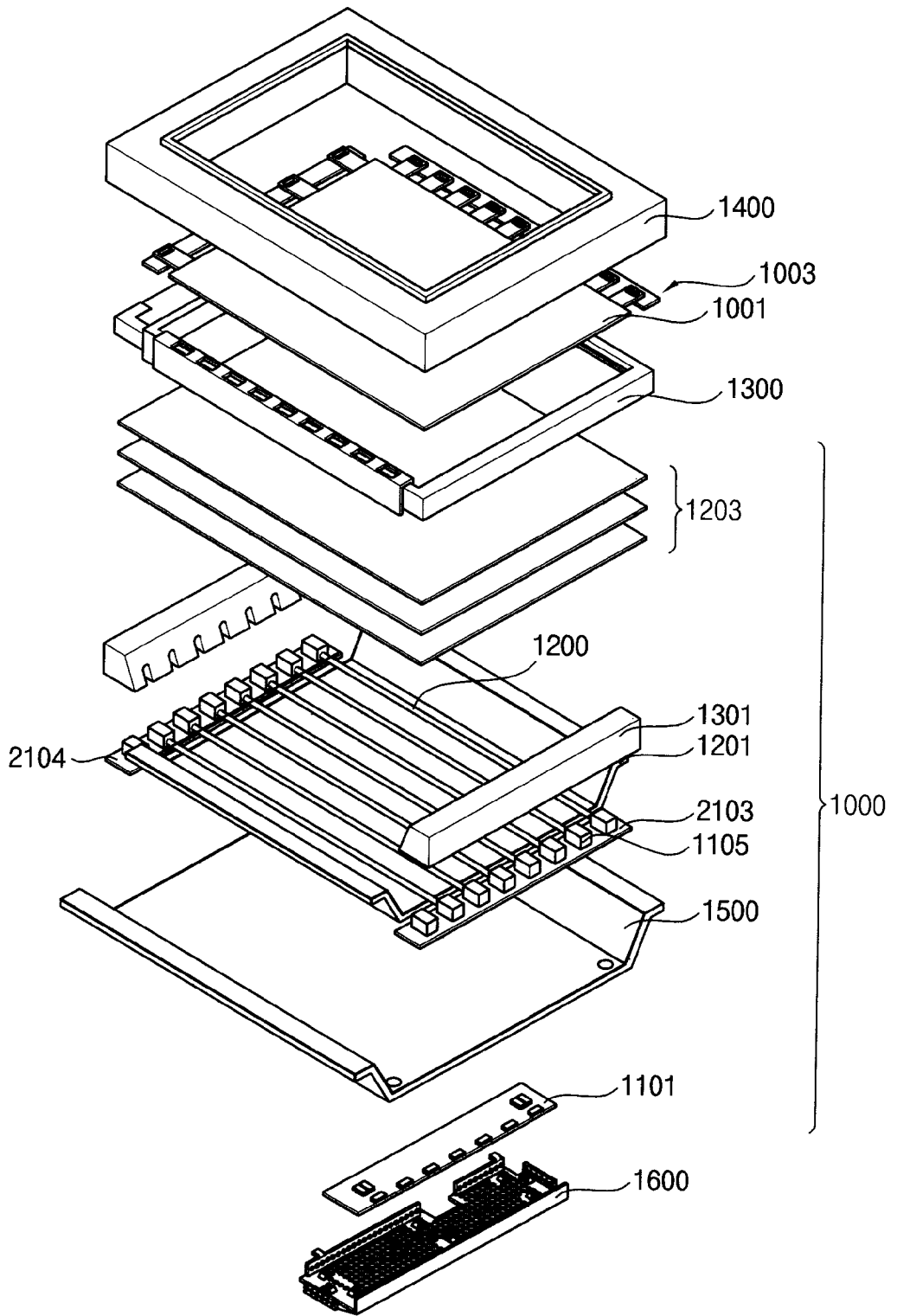
FIG. 8 is an exploded perspective view of another exemplary embodiment of an LCD device according to the present invention.
Figure 9:
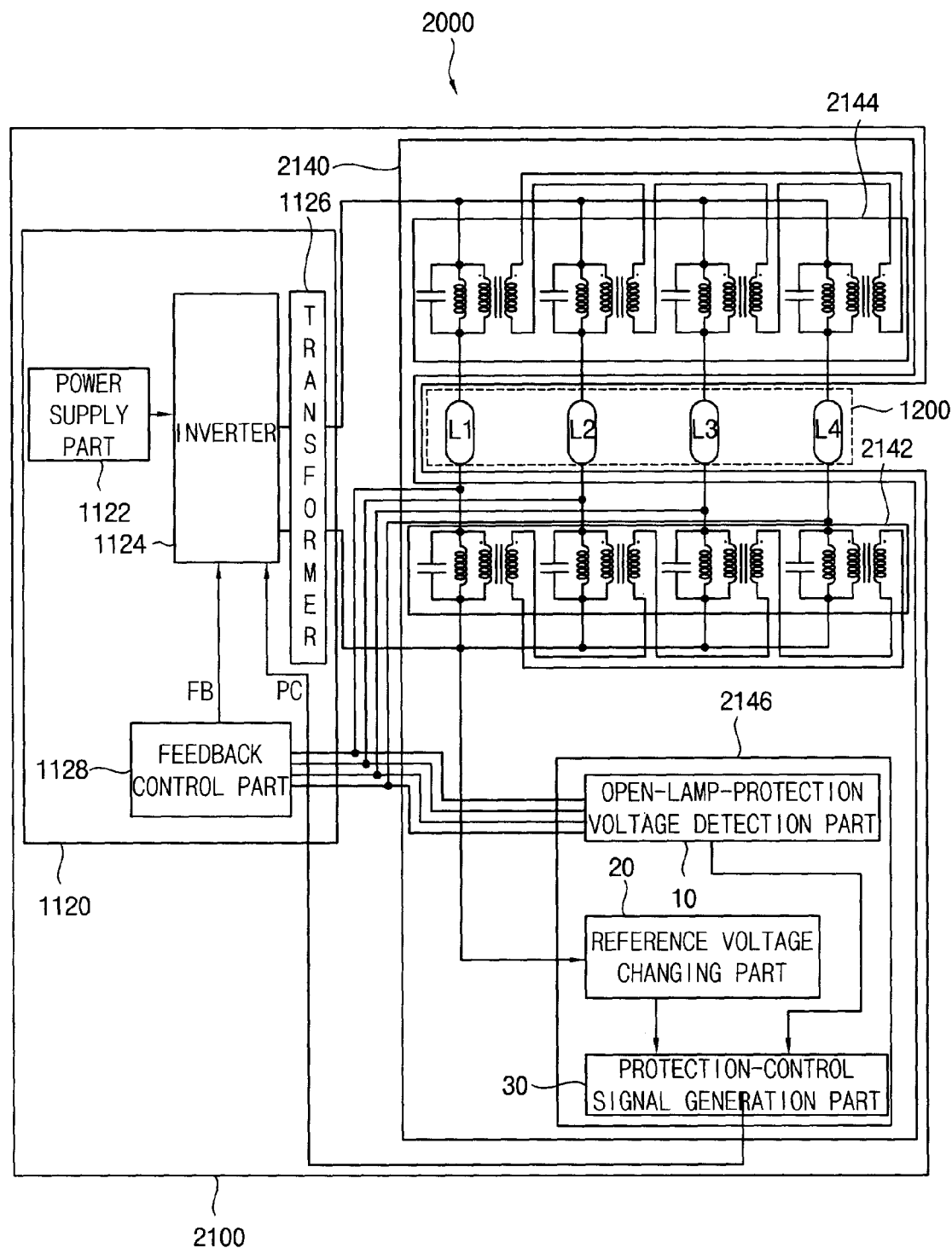
FIG. 9 is a block diagram of an exemplary embodiment of a backlight unit in the exemplary embodiment of the LCD device of FIG. 8.

FIG. 8 is an exploded perspective view illustrating an LCD device in accordance with a second exemplary embodiment. FIG. 9 is a block diagram describing a backlight unit in the LCD device illustrated in FIG. 8.

The exemplary embodiment of an LCD device including a backlight unit described with reference to FIG. 8 may be substantially the same as the exemplary embodiment of an LCD device described with reference to FIG. 1 except that a first trans-balance circuit 2142, a second trans-balance circuit 2144 and a protection circuit 2146 are mounted in a first balance PCB 2103 and a second balance PCB 2104. Therefore, the same reference numbers are used for the same or similar elements, and any further descriptions concerning the same or similar elements as those shown in FIG. 1 will be omitted.

Further, the exemplary embodiment of a backlight unit described with reference to FIG. 9 may be substantially the same as the exemplary embodiment of a backlight unit described with reference to FIG. 2 except for the first transbalance circuit 2142 and the second trans-balance circuit 2144. Therefore, the same reference numbers are used for the same or similar elements, and any further descriptions concerning the same or similar elements as those shown in FIG. 2 will be omitted.

Referring to FIGS. 8 and 9, the light source part 1200 is connected to the first balance PCB 2103 and the second balance PCB 2104. The first balance PCB 2103 includes a first trans-balance circuit 2142 for distributing an electrical current to the light source part 1200 in parallel, and the second balance PCB 2104 includes a second trans-balance circuit 2144 for distributing an electrical current to the light source part 1200 in parallel. The first and second balance PCBs 2103 and 2104 may be arranged substantially perpendicular to a longitudinal direction of the lamps to electrically connect the lamps in parallel with one another.

In one exemplary embodiment, both ends of the light source part 1200 are inserted into a plurality of lamp sockets 1105, and the lamp sockets 1105 are soldered on the first and second balance PCBs 2103 and 2104, so that the light source part 1200 is electrically connected to the first and second balance PCBs 2103 and 2104. As discussed above, alternative methods for fastening the lamp sockets 1105 onto the first and second balance PCBs 2103 and 2104 maybe used. The first and second balance PCBs 2103 and 2104 are connected to the lamp sockets 1105 to provide the light source part 1200 with a high AC voltage provided from the inverter PCB 1101.

The plurality of lamp sockets 1105 soldered on the first and second balance PCBs 2103 and 2104 are mounted on both ends of the bottom cover 1500, and supports the light source part 1200.

The protection circuit 2146, the first trans-balance circuit 2142 and the second trans-balance circuit 2144 may be mounted in the first and second balance PCBs 2103 and 2104.

The first and second trans-balance circuits 2142 and 2144 include a plurality of balance inductors. In one exemplary embodiment, the balance inductors and the protection circuit 2146 may be formed on the first and second balance PCBs 2103 and 2104.

The first and second balance PCBs 2103 and 2104 are disposed at an outside of the reflective sheet 1201 and on a side of the bottom cover 1500. In one exemplary embodiment, the side support 1301 is combined with the bottom cover 1500 to substantially cover the first and second balance PCBs 2103 and 2104. Exemplary embodiments also include configurations wherein the bottom cover 1500 entirely covers the first and second balance PCBs 2103 and 2104.

The inverter PCB 1101 includes the inverter 1124. In the second exemplary embodiment, the number of the inverters 1124 may be smaller than the number of the lamps of the light source part 1200. The LCD device in accordance with the second exemplary embodiment separately includes the first and second balance PCBs 2103 and 2104 including the first and second trans-balance circuits 2142 and 2144, respectively, and this feature is different from a conventional LCD device. The first and second trans-balance circuits 2142 and 2144 divide the electrical power provided from the inverter 1124 in parallel, and provide the light source part 1200 with the electrical power in parallel. Accordingly, an additional plurality of wires for connecting the light source part 1200 to the inverter 1126 may not be necessary, and the light source part 1200 is connected to the first and second balance PCBs 2103 and 2104. That is, one inverter 1126 or a smaller number of inverters 1126 than the number of the lamps of the light source part 1200 may be connected to the first and second balance PCBs 2103 and 2104 through a connector (not shown).

Therefore, the lamps of the light source part 1200 do not directly receive the driving electrical power through corresponding wires (not shown), but receive electrical currents substantially equally distributed in parallel by the first and second trans-balance circuits 2142 and 2144.

Further, the first and second balance PCBs 2103 and 2104 are mounted in a vacant space, e.g., a recess, of the side support 1301. The side support 1301 including the first and second balance PCBs 2103 and 2104 are mounted in the bottom cover 1500, so that a limited space of the LCD device may be effectively utilized to form a thin LCD device.

Figure 10:
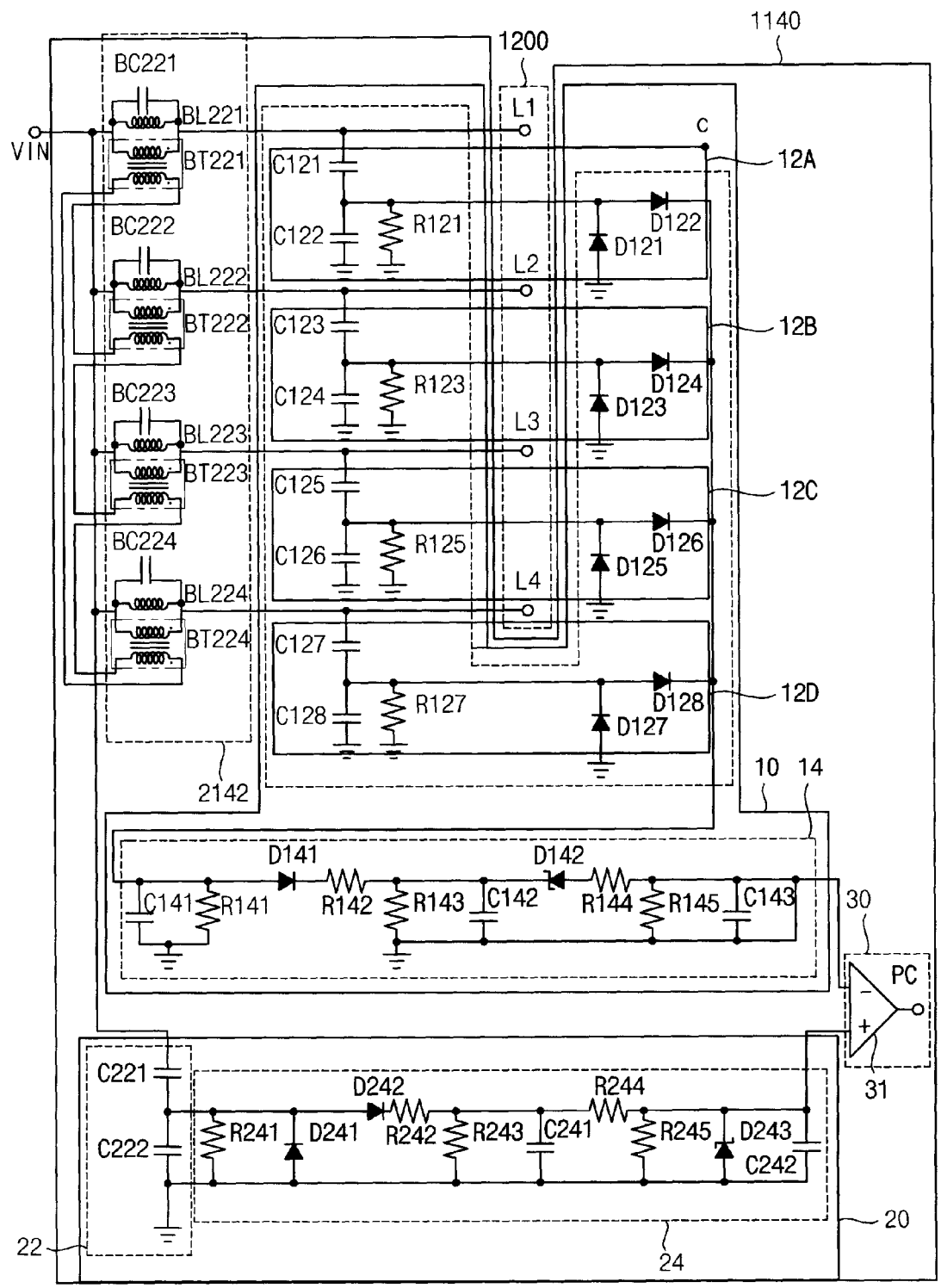
FIG. 10 is a circuit diagram of a lamp and a protection part in the exemplary embodiment of a backlight unit of FIG. 9.

FIG. 10 is a circuit diagram describing the lamp and the protection part of the backlight unit illustrated in FIG. 9.

The lamp and the protection part described with reference to FIG. 10 may be substantially the same as the lamp and the protection part described with reference to FIG. 3 except for the first trans-balance circuit 2142. Therefore, the same reference numbers are used for the same or similar elements, and any further descriptions concerning the same or similar elements as those shown in FIG. 3 will be omitted.

Referring to FIGS. 8, 9 and 10, a backlight unit 2000 included in the LCD device in accordance with the second exemplary embodiment includes a power supply device 2100 and the light source part 1200

The power supply device 2100 includes a power part 1120 and a protection part 2140.

The protection part 2140 includes a first trans-balance circuit 2142, a second trans-balance circuit 2144 and the protection circuit 1146.

In the present exemplary embodiment, the backlight unit may be substantially the same as the backlight unit described with reference to FIG. 2 except that the protection part 2140 includes the first trans-balance circuit 2142 and the second trans-balance circuit 2144 instead of the first capacitor balance circuit 1142 and the second capacitor balance circuit 1144. Therefore, the same reference numbers are used for the same or similar elements, and any further descriptions concerning the same or similar elements will be omitted.

Referring to FIGS. 8, 9 and 10, the first trans-balance circuit 2142 includes first, second, third and fourth balance capacitors BC221, BC222, BC223 and BC224, first, second, third and fourth balance inductors BL221, BL222, BL223 and BL224, and first, second, third and fourth balance transformers BT221, BT222, BT223 and BT224. In one exemplary embodiment, the number of the balance capacitors, balance inductors and the balance transformers may correspond to the number of the lamps of the light source part 1200.

The first, second, third and fourth balance capacitors BC121, BC122, BC123 and BC124, the first, second, third and fourth balance inductors BL221, BL222, BL223 and BL224, and the first, second, third and fourth balance transformers BT221, BT222, BT223 and BT224 may be mounted on the first balance PCB 2103.

The first, second, third and fourth balance transformers BT221, BT222, BT223 and BT224 may be connected to the first electrodes of the first, second, third and fourth lamps L1, L2, L3 and L4. The first, second, third and fourth balance transformers BT221, BT222, BT223 and BT224 control the load properties of the first, second, third and fourth lamps L1, L2, L3 and L4 such that the load properties are not changed by circumstances such as temperature, and maintain a current balance so that uniform currents may flow through the first, second, third and fourth lamps L1, L2, L3 and L4. The first, second, third and fourth balance transformers BT221, BT222, BT223 and BT224 may be disposed between the power part 1120 and the first, second, third and fourth lamps L1, L2, L3 and L4.

The first, second, third and fourth balance capacitors BC121, BC122, BC123 and BC124, and the first, second, third and fourth balance inductors BL221, BL222, BL223 and BL224 are connected to primary terminals of the first, second, third and fourth balance transformers BT221, BT222, BT223 and BT224, respectively, and form a closed loop. Accordingly, a counterbalance and compensation voltage with respect to the electrical current in the closed loop is generated according to an impedance deviation of the first, second, third and fourth lamps L1, L2, L3 and L4, to uniformly maintain a current balance.

Further, a tertiary coil structure, which is formed by the first, second, third and fourth balance inductors BL221, BL222, BL223 and BL224, and the first, second, third and fourth balance transformers BT221, BT222, BT223 and BT224, may allow the protection part 2140 to be easily designed, and may increase the safety of the backlight unit.

In FIG. 9, the protection circuit 1146 is disposed between the first trans-balance circuit 2142 and the first, second, third and fourth lamps L1, L2, L3 and L4, but the protection circuit 1146 may be disposed between the second trans-balance circuit 2144 and the first, second, third and fourth lamps L1, L2, L3 and L4.

The circuit structure of the second trans-balance circuit 2144 may be substantially the same as that of the first trans-balance circuit 2142 except that the balance transformers corresponding to the first, second, third and fourth balance transformers BT221, BT222, BT223 and BT224 of the first trans-balance circuit 2142 are connected to the second electrodes of the first, second, third and fourth lamps L1, L2, L3 and L4.

In the second exemplary embodiment, a relationship between an open-lamp-protection voltage and a reference voltage when the lamp illustrated in FIG. 8 operates normally and when the lamp operates abnormally, and a voltage level difference between a reference voltage and an open-lamp-protection voltage may be substantially the same as those described in the first exemplary embodiment with reference to FIGS. 4 to 5. Therefore, any further descriptions will be omitted.

A method of operating the backlight unit in accordance with the second exemplary embodiment may be substantially the same as that described in the first exemplary embodiment with reference to FIG. 7. Therefore, any further descriptions will be omitted.

In order to prevent the above-mentioned non-operation of the protection circuit 1146, the reference voltage RV is also decreased, when a low local dimming voltage is applied to the light source part 1200 and thus the OLP voltage is decreased. Accordingly, whenever the light source part 1200 operates abnormally, the OLP voltage is higher than the reference voltage RV. Therefore, the protection circuit 1146 maybe prevented from operating even though the light source part 1200 operates abnormally.

According to the exemplary embodiments described herein, when an input voltage and an open-lamp-protection voltage are decreased due to circumstances such as a low local dimming voltage and low temperature, etc., a reference voltage varying according to the decreased input voltage is provided, so that a power supply operates effectively in spite of an abnormal state such as an open lamp. Therefore, an overvoltage may be prevented from being applied to the lamps.

The foregoing is illustrative of the present disclosure and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the appended claims. Exemplary embodiments of the present invention are defined by the following claims, with equivalents of the claims to be included therein.

What is claimed is:

1. A backlight unit comprising:
   a light source;
   an inverter which provides the light source with an input voltage; and
   a printed circuit board connected to the light source,
   wherein the printed circuit board includes a protection circuit which detects an open-lamp-protection voltage which varies according to a change of the input voltage, and changes a reference voltage according to the change of the input voltage, and
   wherein the protection circuit turns off the inverter when the detected open-lamp-protection voltage is higher than the changed reference voltage by comparing the detected open-lamp-protection voltage with the changed reference voltage, and
   wherein the protection circuit includes;
      a voltage detection part which distributes the input voltage applied to the light source by using a capacitor to detect the open-lamp-protection voltage;
      a reference voltage changing part which distributes the input voltage by using the capacitor to change the reference voltage according to the change of the input voltage; and
      a protection-control signal generation part which compares the open-lamp-protection voltage with the reference voltage and generates a protection-control signal Which controls the operation of the inverter.

2. The backlight unit of claim 1, wherein the input voltage is a local dimming voltage.

3. The backlight unit of claim 1, wherein the capacitor is a pattern capacitor comprising patterns disposed on at least one of an upper surface and a lower surface of the printed circuit board.

4. The backlight unit of claim 1, wherein the protection-control signal generation part includes a comparator which compares the open-lamp-protection voltage with the reference voltage.

5. The backlight unit of claim 1, wherein a difference between the open-lamp-protection voltage and the reference voltage is in a range of about 2 Volts to about 11 Volts.

6. The backlight unit of claim 1, wherein the printed circuit board further includes a plurality of balance capacitors which control the input voltage to substantially uniformly maintain a balance of electrical currents applied to the light source.

7. The backlight unit of claim 1, wherein the printed circuit board further includes a plurality of balance inductors which control the input voltage to substantially uniformly maintain a balance of electrical currents applied to the light source.

8. The backlight unit of claim 1, further comprising a feedback control part which generates a feedback signal which controls the voltage level of the input voltage according to whether the light source is turned on normally.

9. The backlight unit of claim 1, wherein the light source is one of a plurality of light-emitting diodes and at least one cold cathode fluorescent lamp.

10. A method of operating a backlight unit, the method comprising:
- applying an input voltage to a light source;
- detecting an open-lamp-protection voltage using a capacitor to distribute the input voltage;
- changing a reference voltage according to the change of the input voltage using the capacitor to distribute the input voltage;
- comparing the detected open-lamp-protection voltage with the changed reference voltage; and
- turning off the input voltage applied to the light source when the detected open-lamp-protection voltage is higher than the changed reference voltage by comparing the detected open-lamp-protection voltage with the changed reference voltage.

11. The method of claim 10, wherein turning off the input voltage includes:
- changing the reference voltage according to a change of the input voltage;
- comparing the open-lamp-protection voltage with the changed reference voltage; and
- turning off the input voltage applied to the light source when the detected open-lamp-protection voltage is higher than the changed reference voltage, or maintaining the input voltage applied to the light source when the detected open-lamp-protection voltage is substantially the same as or lower than the changed reference voltage.

12. The method of claim 11, wherein the input voltage is turned off when the detected open-lamp-protection voltage is higher than the changed reference voltage for about 2 seconds or longer.

13. The method of claim 11, wherein a difference between the open-lamp-protection voltage and the reference voltage is in a range of about 2 Volts to about 11 volts.

14. A liquid crystal display device comprising:
- an liquid crystal display panel which displays an image; and
- a backlight unit providing the liquid crystal display panel with light, the backlight unit including:
  - a light source;
  - an inverter which provides the light source with an input voltage; and
  - a printed circuit board connected to the light source, the printed circuit board including a protection circuit which detects an open-lamp-protection voltage which varies according to a change of the input voltage and changes a reference voltage according to the change of the input voltage, and the protection circuit turns off the inverter when the detected open-lamp-protection voltage is higher than the changed reference voltage by comparing the detected open-lamp-protection voltage with the changed reference voltage, and
- wherein the protection circuit includes:
  - a voltage detection part which distributes the input voltage applied to the light source by using a capacitor to detect the open-lamp-protection voltage;
  - a reference voltage changing part which distributes the input voltage by using the capacitor to change the reference voltage according to the change of the input voltage; and
  - a protection-control signal generation part which compares the open-lamp-protection voltage with the reference voltage and generates a protection-control signal which controls the operation of the inverter.

15. The liquid crystal display device of claim 14, wherein the input voltage is a local dimming voltage.

16. The liquid crystal display device of claim 14, wherein the capacitor is a pattern capacitor comprising patterns disposed on at least one of an upper surface and a lower surface of the printed circuit board.

17. The liquid crystal display device of claim 14, wherein the printed circuit board further includes a plurality of balance capacitors which control the input voltage to uniformly maintain a balance of electrical currents applied to the light source.

18. The liquid crystal display device of claim 14, wherein the printed circuit board further includes a plurality of balance inductors which control the input voltage to substantially uniformly maintain a balance of electrical currents applied to the light source.

19. The liquid crystal display device of claim 14, further comprising a feedback control part which generates a feedback signal which controls the voltage level of the input voltage according to whether the light source is turned on normally.

20. The liquid crystal display device of claim 14, wherein the light source is one of a plurality of light-emitting diodes and at least one cold cathode fluorescent lamp.

* * * * *